(12) United States Patent
Iijima et al.

(10) Patent No.: US 6,726,852 B2
(45) Date of Patent: Apr. 27, 2004

(54) METHOD OF MANUFACTURING SYNTHESIS GAS

(75) Inventors: Masaki Iijima, Tokyo (JP); Kazuto Kobayashi, Tokyo (JP); Kazuhiro Morita, Tokyo (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 277 days.

(21) Appl. No.: 09/801,720

(22) Filed: Mar. 9, 2001

(65) Prior Publication Data

US 2002/0024038 A1 Feb. 28, 2002

(30) Foreign Application Priority Data

Aug. 16, 2000 (JP) ........................................ 2000-246913

(51) Int. Cl.$^7$ .............................. C01J 3/00; B01J 20/02; B01J 8/00; C01B 3/26; C01B 31/18
(52) U.S. Cl. ........................ 252/373; 423/230; 423/231; 423/233; 423/244.01; 423/244.06; 423/418.2; 423/650; 502/406
(58) Field of Search ...................... 252/373; 423/244.01, 423/244.06, 650, 418.2, 230, 231, 233; 502/406

(56) References Cited

U.S. PATENT DOCUMENTS

| | | | |
|---|---|---|---|
| 3,947,547 A | * 3/1976 | Groenendaal et al. | ....... 423/242 |
| 4,091,073 A | * 5/1978 | Winkler | ....................... 423/226 |
| 4,251,495 A | * 2/1981 | Deschamps et al. | ........ 423/230 |
| 4,521,387 A | * 6/1985 | Broecker et al. | ........... 423/210 |
| 4,552,572 A | * 11/1985 | Galstaun | ........................ 55/36 |
| 4,769,045 A | * 9/1988 | Grindley | ..................... 48/202 |
| 4,925,644 A | * 5/1990 | Najjar et al. | ................. 423/415 |
| 5,244,641 A | * 9/1993 | Khare | ....................... 423/220 |
| 5,320,992 A | 6/1994 | Fox et al. | |
| 5,556,605 A | * 9/1996 | Stigsson | ....................... 423/220 |
| 5,763,716 A | 6/1998 | Benham et al. | ............. 585/315 |
| 5,958,359 A | * 9/1999 | Buchanan et al. | ........ 423/573.1 |
| 6,103,206 A | * 8/2000 | Taylor et al. | ................. 423/210 |
| 6,274,031 B1 | * 8/2001 | Khare et al. | ................. 208/250 |

FOREIGN PATENT DOCUMENTS

| | | | |
|---|---|---|---|
| EP | 0 328 479 | 8/1989 | |
| EP | 1 005 577 | 6/2000 | |
| GB | 2281077 A | * 2/1995 | ............. C01B/3/38 |
| WO | 00/09441 | 2/2000 | |

OTHER PUBLICATIONS

J. A. Moulijn E. A.: "Process Technology, Chapter 4 Synthesis Gas" Jan. 1, 1997, Technical University, DELFT XP002225940 * p. 8, paragraph 4.3.2.3; figure 4.6.

* cited by examiner

Primary Examiner—Stanley S. Silverman
Assistant Examiner—Jonas N. Strickland
(74) Attorney, Agent, or Firm—Wenderoth, Lind & Ponack, LLP

(57) ABSTRACT

A method of manufacturing a synthesis gas containing hydrogen and carbon monoxide comprises steps of removing only hydrogen sulfide from a natural gas containing hydrogen sulfide and carbon dioxide by permitting the natural gas to pass through a hydrogen sulfide-removing device filled with a hydrogen sulfide absorbent, adding carbon dioxide and steam to the natural gas which the hydrogen sulfide has been removed to prepare a mixed gas, and feeding the mixed gas into a reaction tube of a reformer, thereby permitting mainly a steam reforming reaction to take place in the mixed gas. This method enables hydrogen sulfide in natural gas to be removed while permitting the carbon dioxide of natural gas to be effectively utilized, thereby reducing the quantity of carbon dioxide to be added to the natural gas to be transferred to the reformer.

4 Claims, 2 Drawing Sheets

METHOD OF MANUFACTURING SYNTHESIS GAS

CROSS-REFERENCE TO RELATED APPLICATIONS

This application is based upon and claims the benefit of priority from the prior Japanese Patent Application No. 2000-246913, filed Aug. 16, 2000, the entire contents of which are incorporated herein by reference.

BACKGROUND OF THE INVENTION

This invention relates to a method of manufacturing a synthesis gas to be employed for the synthesis of gasoline, methanol or dimethyl ether by way of the GTL (Gas to Liquid) process.

A synthesis gas comprising hydrogen ($H_2$) and carbon monoxide (CO) has been employed as a raw material for the synthesis of gasoline, etc. by way of the GTL (Gas to Liquid) process according to the Fisher-Tropsch reaction system.

This synthesis gas has been conventionally manufactured by a method wherein steam and carbon dioxide are added at first to a natural gas employed as a raw gas to prepare a mixed gas, which is then fed to the reaction tube of reformer which has been heated to a predetermined temperature so as to steam-reform the natural gas together with carbon dioxide, thereby manufacturing the synthesis gas containing hydrogen ($H_2$) and carbon monoxide (CO).

By the way, depending on the place of origin, the natural gas occasionally contains hydrogen sulfide ($H_2S$) and carbon dioxide (for example, $CO_2$: 7.1% by volume, and $H_2S$: 0.6% by volume). When such a natural gas is to be employed as a raw material, it is usually practiced to remove hydrogen sulfide prior to the step of adding steam and carbon dioxide to the natural gas. In this case, the removal of hydrogen sulfide from the natural gas is conventionally performed by means of amine absorption method.

However, if it is desired to remove hydrogen sulfide to a level of the order of ppm by means of the amine absorption method, carbon dioxide included in the original natural gas is also removed together with hydrogen sulfide. As a result, it becomes impossible to utilize the carbon dioxide that has been originally included in the natural gas, so that a large quantity of carbon dioxide is required to be supplied to the natural gas prior to the stage where the natural gas is to be transferred to the reaction tube of the reformer, thus increasing the manufacturing cost of the synthesis gas.

BRIEF SUMMARY OF THE INVENTION

Therefore, an object of this invention is to provide a method for manufacturing a synthesis gas, which makes it possible to effectively utilize the carbon dioxide in a natural gas containing hydrogen sulfide and carbon dioxide by selectively removing only the hydrogen sulfide therefrom in the synthesis gas manufacturing method employing a reformer, thereby making it possible to reduce the quantity of carbon dioxide to be added to the natural gas prior to the stage where the natural gas is to be transferred to the reformer.

Namely, this invention provides a method of manufacturing a synthesis gas containing hydrogen and carbon monoxide, which comprises steps of;

removing only hydrogen sulfide from a natural gas containing hydrogen sulfide and carbon dioxide by permitting the natural gas to pass through a hydrogen sulfide-removing device filled with a hydrogen sulfide absorbent;

adding carbon dioxide and steam to the natural gas which the hydrogen sulfide has been removed to prepare a mixed gas; and feeding the mixed gas into a reaction tube of a reformer, thereby permitting mainly a steam reforming reaction to take place in the mixed gas.

The method of manufacturing a synthesis gas according to this invention may be performed in such a way that before the natural gas is fed to the hydrogen sulfide-removing device, the natural gas is forced to pass through a convection portion communicated with a combustion radiation portion of the reformer, thereby heating the natural gas up to a temperature which is suited for the reaction between the hydrogen sulfide in the natural gas and the hydrogen sulfide adsorbent.

The method of manufacturing a synthesis gas according to this invention may be performed in such a way that the carbon dioxide recovered from a combustion exhaust gas generated at the combustion radiation portion of the reformer is utilized as a carbon dioxide source.

The method of manufacturing a synthesis gas according to this invention may be performed in such a way that the carbon dioxide recovered from the synthesis gas at a downstream side of the reformer is utilized as a carbon dioxide source.

It is preferable in the method of manufacturing a synthesis gas according to this invention that the hydrogen sulfide adsorbent is at least one oxide selected from triiron tetraoxide ($Fe_3O_4$) and zinc oxide (ZnO).

It is preferable in the method of manufacturing a synthesis gas according to this invention that the hydrogen sulfide-removing device is provided with at least one unit of first desulfurizing column filled with the hydrogen sulfide adsorbent comprising triiron tetraoxide and with a second desulfurizing column filled with the hydrogen sulfide adsorbent comprising zinc oxide, and that the natural gas containing hydrogen sulfide and carbon dioxide is permitted to successively pass through one column selected from these first desulfurizing columns and second desulfurizing column.

It is preferable that the hydrogen sulfide-removing device is provided with at least three units of first desulfurizing columns to be filled with triiron tetraoxide, wherein a first placed first desulfurizing column among the first desulfurizing columns is designed to execute an adsorption operation of hydrogen sulfide, a second placed first desulfurizing column among the first desulfurizing columns is designed to execute an operation of regenerating the adsorbent (iron sulfide) on which hydrogen sulfide is adsorbed, and a third placed first desulfurizing column among the first desulfurizing columns is designed to execute an operation of reducing the adsorbent that has been regenerated, these operations being sequentially executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Next, the method of manufacturing a synthesis gas (which is suited for use in synthesizing for example gasoline, kerosene and gas oil) will be explained with reference to the accompanying drawings.

Figure 1:
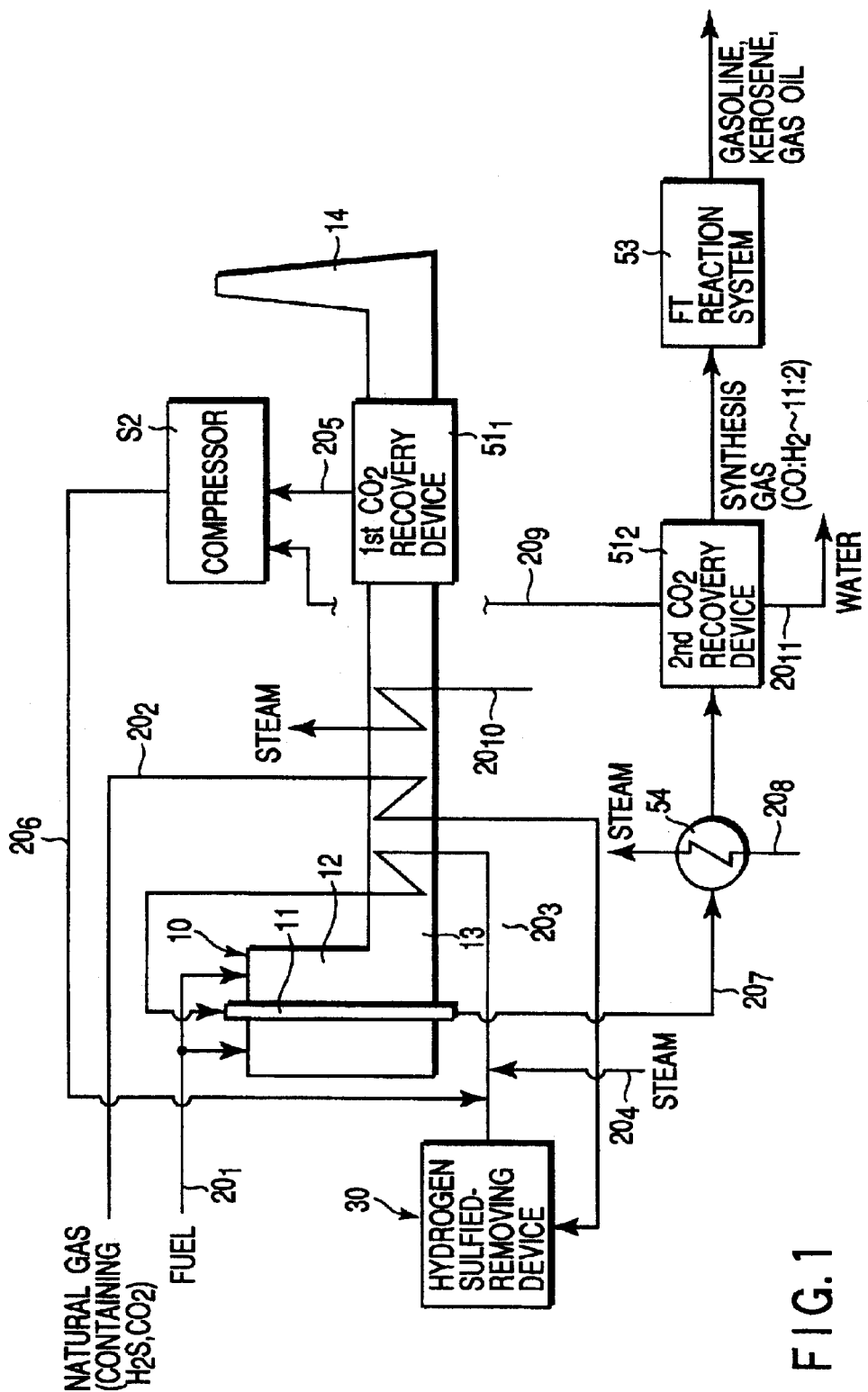
FIG. 1 is a flow chart illustrating main manufacturing steps of synthesis gas in a synthesizing plant of gasoline, kerosene and gas oil, which is employed in an embodiment of this invention.

FIG. 1 is a flow chart illustrating main manufacturing steps of synthesis gas in a synthesizing plant of gasoline, kerosene and gas oil, which is employed in an embodiment of this invention.

Referring to FIG. 1, a reformer 10 comprises a reaction tube 11 adapted to be employed for steam reforming, a combustion radiation portion 12 disposed around the reaction tube 11 and designed to heat the reaction tube through the combustion of fuel, and a chimney 14 which is communicated via a convection portion (waste heat recovering portion) 13 with the combustion radiation portion 12. The reaction tube 11 is filled therein with a nickel-based catalyst for instance. A fuel-introducing passageway $20_1$ is communicated with the combustion radiation portion 12 of the reformer 10.

Figure 2:
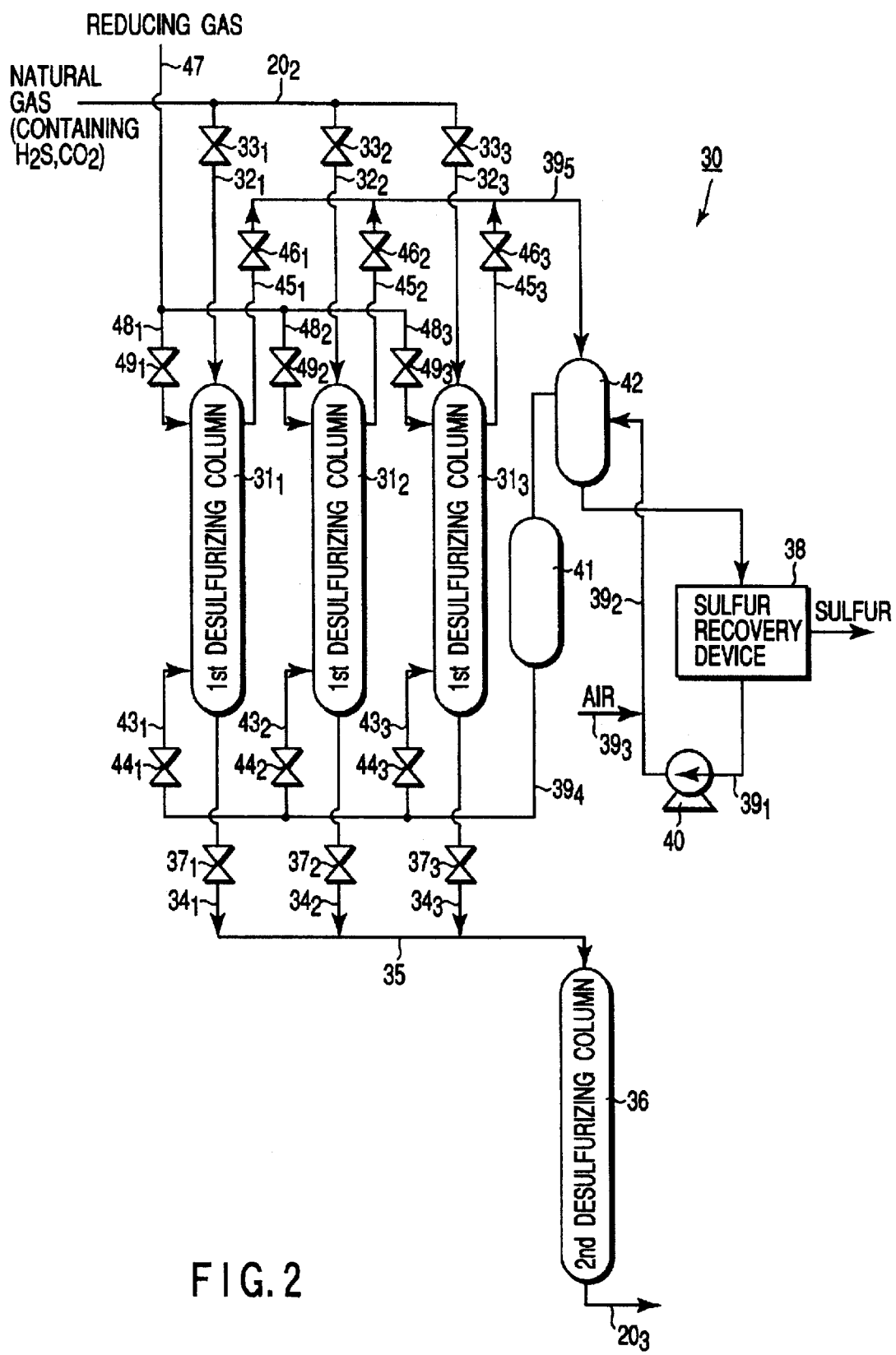
FIG. 2 is a flow chart illustrating the hydrogen sulfide-removing device which is adapted to be incorporated in the synthesizing plant of FIG. 1.

A natural gas-introducing passageway $20_2$ is communicated via a convection portion 13 of the reformer 10 with a hydrogen sulfide-removing device 30. As shown in FIG. 2, this hydrogen sulfide-removing device 30 is provided with three units of first desulfurizing columns $31_1$ to $31_3$, each filled with a hydrogen sulfide adsorbent such as triiron tetraoxide ($Fe_3O_4$) particles. Three natural gas-introducing branch passageways $32_1$ to $32_3$ which are branched from the natural gas-introducing passageway $20_2$ are communicated with the top portions of the first desulfurizing columns $31_1$ to $31_3$, respectively. Natural gas inlet on-off valves $33_1$ to $33_3$ are attached to the natural gas-introducing branch passageways $32_1$ to $32_3$, respectively. The bottom portions of the first desulfurizing columns $31_1$ to $31_3$ are connected, via natural gas-discharging branch passageways $34_1$ to $34_3$ and via a passageway 35 with which these natural gas-discharging branch passageways $34_1$ to $34_3$ are combined, with a top portion of a second desulfurizing column 36 filled with zinc oxide particles employed as a hydrogen sulfide absorbent. The bottom portion of the second desulfurizing column 36 is connected with a raw gas-introducing passageway $20_3$ to be explained hereinafter. Natural gas outlet on-off valves $37_1$ to $37_3$ are attached to the natural gas-discharging branch passageways $34_1$ to $34_3$, respectively.

A sulfur recovery device 38 is communicated through a passageway $39_1$ with a circulating gas blower 40. This circulating gas blower 40 is communicated through a passageway $39_2$ with a preheater 41. Air is supplied to the hydrogen sulfide-removing device 30 via a passageway $39_3$ disposed in the vicinity of the circulating gas blower 40. The passageway $39_2$ is provided with a gas—gas heat exchanger 42 for executing a heat exchange between the gas mixed with the air from the circulating gas blower 40 and the heated sulfur dioxide gas that has been discharged from the first desulfurizing column provided for executing the regeneration process (to be explained hereinafter). The preheater 41 is communicated via a passageway $39_4$ and three branch passageways $43_1$ to $43_3$ branched from the passageway $39_4$ with each of the bottom portions of the first desulfurizing columns $31_1$ to $31_3$. Air-containing gas inlet on-off valves $44_1$ to $44_3$ are attached to the branch passageways $43_1$ to $43_3$, respectively. The top portions of the first desulfurizing columns $31_1$ to $31_3$ are connected, via sulfur dioxide gas-discharging branch passageways $45_1$ to $45_3$ and via a passageway $39_5$ with which these branch passageways $45_1$ to $45_3$ are combined, with the sulfur recovery device 38. Sulfur dioxide gas outlet on-off valves $46_1$ to $46_3$ are attached to the branch passageways $45_1$ to $45_3$, respectively. The passageway $39_5$ is provided with the aforementioned gas—gas heat exchanger 42.

A reducing gas-introducing passageway 47 is branched at the distal end thereof, thus forming three branch passageways $48_1$ to $48_3$ which are communicated with top portions of the first desulfurizing columns $31_1$ to $31_3$, respectively. Reducing gas on-off valves $49_1$ to $49_3$ are attached to the branch passageways $48_1$ to $48_3$, respectively.

The hydrogen sulfide-removing device 30 constructed as explained above is communicated, via a raw gas-introducing passageway $20_3$ which is disposed so as to pass through the convection portion 13, with a top portion of the reaction tube 11. A distal end of steam-introducing passageway $20_4$ is communicated with the raw gas-introducing passageway $20_3$ through a midway portion thereof which is located on the downstream side of the hydrogen sulfide-removing device 30 and also on the upstream side of the convection portion 13.

A first carbon dioxide recovery device $51_1$ is disposed at the convection portion 13 of the reformer 10, thereby enabling carbon dioxide to be recovered from the combustion exhaust gas of the convection portion 13. This carbon dioxide recovery device $51_1$ is connected via the passageway $20_5$ with a compressor 52. This compressor 52 is communicated, via a passageway $20_6$, with a midway portion of the raw gas-introducing passageway $20_3$ which is located on the downstream side of the hydrogen sulfide-removing device 30 and also on the upstream side of the convection portion 13.

One end of synthesis gas passageway $20_7$ is connected with a lower end portion of the reaction tube 11 of the reformer 10 and the other end thereof is connected with the Fisher-Tropsch (FT) reaction system 53 which is filled with a cobalt-based catalyst for instance. By the way, the catalyst to be filled in this FT reaction system 53 may not be confined to the cobalt-based catalyst but may be an iron-based catalyst for instance. A heat exchanger 54 and a second carbon dioxide recovery device $51_2$ are disposed on the downstream side of the reformer 10 and successively arranged in the mentioned order on the synthesis gas passageway $20_7$. This heat exchanger 54 is disposed enabling a passageway $20_8$ to intersect therewith so as to heat for example a boiler water passing through this passageway $20_8$, thereby generating a high-pressure steam. The second carbon dioxide recovery device $51_2$ is connected via a passageway $20_9$ with the compressor 52. By the way, a passageway $20_{10}$ for passing a boiler water for instance is disposed to intersect with the convection portion 13 of the reformer 10, thereby enabling a heat exchange to be executed between the combustion exhaust gas of the convection portion 13 and the boiler water. As a result, the combustion exhaust gas is cooled and at the same time, the boiler water itself is heated to generate a high-pressure steam.

Next, the method of manufacturing a synthesis gas will be explained with reference to the synthesizing plant shown in FIGS. 1 and 2.

First of all, a fuel for combustion is fed via the fuel-introducing passageway $20_1$ to the combustion radiation portion 12 of the reformer 10 so as to allow the fuel to burn together with air, thereby heating the interior of reaction tube 11 up to a sufficiently high temperature (for example, 850–900° C.). This heating of the reaction tube 11 is performed because this reforming reaction at the reformer 10 is an endothermic reaction. The combustion exhaust gas containing carbon dioxide and generated at this combustion radiation portion 12 is allowed to flow via the convection portion 13 into the chimney 14. As the combustion exhaust gas passes through the convection portion 13, the combustion exhaust gas is heat-exchanged with the natural gas passing through the natural gas-introducing passageway $20_2$, with the after-mentioned natural gas mixed with carbon dioxide and steam and passing through the raw gas-introducing passageway $20_3$, and also with the boiler water passing through the passageway $20_{10}$, thereby cooling the combustion exhaust gas. The carbon dioxide in the combustion exhaust gas thus cooled is recovered by the first carbon dioxide recovery device $51_1$ and then, fed via the passageway $20_5$ to the compressor 52. The combustion exhaust gas thus cooled and depleted of carbon dioxide is released via the chimney 14 to air atmosphere.

Natural gas containing methane as a main component and also containing hydrogen sulfide and carbon dioxide is fed to the natural gas-introducing passageway $20_2$ and allowed to pass through this passageway $20_2$ and hence through the convection portion 13 of the reformer 10, during which the natural gas is heated up to a temperature (for example, 400° C.) which is optimal for the reaction between the hydrogen sulfide and the triiron tetraoxide ($Fe_3O_4$) employed as a hydrogen sulfide adsorbent (to be explained hereinafter). The natural gas thus heated is introduced into the hydrogen sulfide-removing device 30. The natural gas inlet on-off valve $33_1$ attached to the natural gas-introducing branch passageway $32_1$ attached to the natural gas-discharging branch passageway $34_1$ are respectively opened in this hydrogen sulfide-removing device 30, the aforementioned heated natural gas is allowed to enter only into the first desulfurizing column $31_1$ (positioned on the left side of FIG. 2) which is filled with the triiron tetraoxide ($Fe_3O_4$) particles. Then, in this first desulfurizing column $31_1$, the hydrogen sulfide ($H_2S$) in the natural gas is permitted to react with the triiron tetraoxide ($Fe_3O_4$) particles at the aforementioned temperature (400° C.) according to the following reaction formula (1), thereby enabling most of the hydrogen sulfide to be removed from the natural gas.

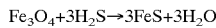

$$Fe_3O_4 + 3H_2S \rightarrow 3FeS + 3H_2O \tag{1}$$

The natural gas that has passed through the first desulfurizing column $31_1$ is then fed, via the natural gas-discharging branch passageway $34_1$ and the passageway 35, to the second desulfurizing column 36 which is filled with the zinc oxide (ZnO) particles. Then, in this second desulfurizing column 36, any residual hydrogen sulfide left in the natural gas is permitted to react with the zinc oxide (ZnO) particles according to the following reaction formula (2), thereby enabling the residual hydrogen sulfide to be removed from the natural gas.

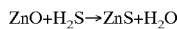

$$ZnO + H_2S \rightarrow ZnS + H_2O \tag{2}$$

In the process wherein the natural gas containing hydrogen sulfide and carbon dioxide is permitted to pass through the first desulfurizing column $31_1$ which is filled with the triiron tetraoxide ($Fe_3O_4$) particles and then through the second desulfurizing column 36 which is filled with the zinc oxide (ZnO) particles, only the hydrogen sulfide is enabled to be removed to a level in the order of ppm without allowing the carbon dioxide to be removed from the natural gas in contrast with the conventional amine absorption method.

When the desulfurizing performance of the triiron tetraoxide ($Fe_3O_4$) particles filled in the first desulfurizing column $31_1$ which is disposed on the left side in FIG. 2 among these three units of the first desulfurizing columns $31_1$ to $31_3$ is deteriorated due to the reaction thereof to remove hydrogen sulfide from the natural gas, the feeding of the natural gas may be successively switched from this first desulfurizing column $31_1$ to the first desulfurizing column $31_2$ which is disposed at the center in FIG. 2, and subsequently, to the first desulfurizing column $31_3$ which is disposed on the right side in FIG. 2, thereby enabling the hydrogen sulfide to be continuously removed from the natural gas.

Once the desulfurizing performance of one of the first desulfurizing columns is deteriorated due to the desulfurizing operation thereof, that first desulfurizing column (for example, the first desulfurizing column $31_2$ which is disposed at the center in FIG. 2) is subjected to the regeneration treatment as follows. Namely, the air-containing gas inlet on-off valve $44_2$ attached to the branch passageway $43_2$ as well as the sulfur dioxide gas outlet on-off valve $46_2$ attached to the sulfur dioxide gas-discharging branch passageway $45_2$ are respectively opened at first. Subsequently, the circulating gas blower 40 is actuated to thereby introduce the gas (mainly nitrogen gas) that has been separated by the sulfur recovery device 38 into the gas—gas heat exchanger 42 via the passageways $39_1$ and $39_2$, and at the same time, air is supplied via the passageway $39_3$ to the passageway $39_2$. The gas mainly consisted of air that has been heat-exchanged with the heated sulfur dioxide gas (to be explained hereinafter) at the gas—gas heat exchanger 42 is fed through the passageway $39_4$ and the branch passageway $43_2$ to a lower portion of the first desulfurizing column $31_2$. In the course of process wherein the gas mainly consisted of air is permitted to pass through the passageway $39_4$, the gas mainly consisted of air is heated up to a temperature (for example, 600° C.) which is optimal for the regeneration of iron sulfide (FeS) (to be explained hereinafter) by means of the preheater 41 attached to the passageway $39_4$. When this heated gas mainly consisted of air is introduced into the first desulfurizing column $31_2$, the iron sulfide (FeS) produced in the aforementioned desulfurization operation as shown by the aforementioned reaction formula (1) is reacted with oxygen according to the following reaction formula (3), thereby producing diiron trioxide ($Fe_2O_3$) and sulfur dioxide gas ($SO_2$), thus accomplishing the regeneration.

$$4FeS + 7O_2 \rightarrow 2Fe_2O_3 + 4SO_2 \tag{3}$$

The sulfur dioxide gas that has been generated at the first desulfurizing column $31_2$ is then transferred via the sulfur dioxide gas-discharging branch passageway $45_2$ and the passageway $39_5$ to the sulfur recovery device 38. In the course of process wherein the sulfur dioxide gas passes through the passageway $39_5$, it is heat-exchanged with the gas mainly consisted of air at the gas—gas heat exchanger 42 which is attached to the passageway $39_5$, thereby cooling the sulfur dioxide gas. This cooled sulfur dioxide gas is then transferred to the sulfur recovery device 38 in which sulfur is recovered from the sulfur dioxide gas.

Meanwhile, at the first desulfurizing columns which is filled with the hydrogen sulfide adsorbent that has undergone the aforementioned regeneration treatment (for example, the first desulfurizing column $31_3$ which is disposed on the right side in FIG. 2), the reduction treatment of the hydrogen sulfide adsorbent will be performed as follows. Namely, the reducing gas on-off valve $49_3$ attached to the branch passageway $48_3$ is opened at first. Then, a reducing gas (for example, hydrogen gas) is fed via the reducing gas-introducing passageway 47 and the passageway $48_3$ to a top portion of the first desulfurizing column $31_3$. When hydrogen gas is introduced into this first desulfurizing column $31_3$, the diiron trioxide ($Fe_2O_3$) that has been produced through the regeneration operation as shown by the aforementioned reaction formula (3) is reacted with the hydrogen gas as shown by the reaction formula (4) to thereby produce triiron tetraoxide ($Fe_3O_4$) to be employed in the desulfurization and water ($H_2O$). The water thus produced is transferred from the natural gas-discharging branch passageway $34_3$ via a passageway (not shown) to the first desulfurizing column for executing the desulfurizing operation (for example, the first desulfurizing column $31_1$ which is disposed on the left side in FIG. 2).

$$3Fe_2O_3 + H_2 \rightarrow 2Fe_3O_4 + H_2O \qquad (4)$$

All of these desulfurizing operation, regenerating operation and reducing operation are concurrently performed in order to smoothly perform the desulfurization.

The natural gas thus depleted of hydrogen sulfide is fed to the raw gas-introducing passageway $20_3$. On this occasion, the carbon dioxide that has been compressed by the compressor 52 is added via the passageway $20_6$ to the natural gas at a predetermined ratio to prepare a carbon dioxide-containing natural gas. Further, steam is also added via the steam-introducing passageway $20_4$ to the carbon dioxide-containing natural gas at a predetermined ratio to prepare a mixed gas. By the way, as for this steam, the steam that has been generated through a heat exchange between the boiler water and the synthesis gas at the heat exchanger 54 as well as the steam that has been generated through a heat exchange between the boiler water and the combustion exhaust gas at the convection portion 13 of reformer 10 can be utilized.

The mixed gas, i.e., the natural gas mixed with carbon dioxide and steam is allowed to flow inside the raw gas-introducing passageway $20_3$ and preheated as this mixed gas passes through the convection portion 13 of reformer 10, after which this mixed gas thus preheated is fed to the reaction tube 11. The natural gas containing methane ($CH_4$) as a main component, steam and carbon dioxide, which have been fed to the reaction tube 11 of the reformer 10 are then subjected to steam reforming process wherein methane is mainly steam-reformed under the presence of a catalyst disposed inside the reaction tube 11, thereby manufacturing a synthesis gas containing hydrogen gas, carbon monoxide and carbon dioxide according to the following formulas (5) and (6).

$$CH_4 + H_2O \rightleftharpoons CO + 3H_2 \qquad (5)$$

$$CO + H_2O \rightleftharpoons CO_2 + H_2 \qquad (6)$$

In these formulas (5) and (6) of the reforming reaction, 4 moles of hydrogen and one mole of carbon dioxide can be produced through the reaction between one mole of methane and 2 moles of steam. In the actual reaction system however, a composition which is close to a chemical equilibrium composition that can be determined by the temperature and pressure at the outlet of the reaction tube can be obtained.

Therefore, it would be possible to manufacture a synthesis gas containing hydrogen gas, carbon monoxide and carbon dioxide with a molar ratio of $H_2$/CO ranging from 1 to 2.5 by setting the contents of methane of the natural gas, steam and carbon dioxide to such that the molar ratio between methane ($CH_4$) and stream ($H_2O$) falls within the range of: $CH_4:H_2O=1:1.5$ to 1:3; while the molar ratio between methane ($CH_4$) and carbon dioxide ($CO_2$) falls within the range of: $CH_4:CO_2=1:1$ to 1:3 on the occasion of adding steam and carbon dioxide to the natural gas.

The synthesis gas thus obtained is fed via a synthesis gas passageway $20_7$ to the heat exchanger 54 to thereby heat the boiler water flowing through the passageway $20_8$ to generate a high-pressure steam. Concurrently, the synthesis gas itself is cooled and then, fed to the second carbon dioxide recovery device $51_2$, in which the carbon dioxide in the natural gas is recovered, and the water concurrently generated is discharged outside the system through a passageway $20_{11}$. The carbon dioxide thus recovered is transferred via the passageway $20_9$ to the compressor 52 and compressed together with the carbon dioxide that has been recovered at the first carbon dioxide recovery device $51_1$, the carbon dioxide thus compressed being subsequently added via the passageway $20_6$ to the natural gas existing inside the raw gas-introducing passageway $20_3$.

The synthesis gas thus depleted of carbon dioxide is then transferred via the passageway $20_7$ to the Fisher-Tropsch (FT) reaction system 53 which is filled with a cobalt-based catalyst for instance, thereby allowing the hydrogen and carbon monoxide all included in the synthesis gas to react with each other, thus synthesizing gasoline, kerosene and gas oil.

According to this embodiment, before the step of adding carbon dioxide and steam to a natural gas containing hydrogen sulfide and carbon dioxide, the natural gas is allowed to pass through the hydrogen sulfide-removing device 30 filled with a hydrogen sulfide adsorbent to thereby selectively removing the hydrogen sulfide from the natural gas without allowing the carbon dioxide to be removed from the natural gas in contrast with the conventional amine absorption method. Therefore, it is possible according to this invention to effectively utilize the carbon dioxide of the natural gas and to reduce the quantity of carbon dioxide to be added to the natural gas prior to the stage of introducing the natural gas into the reformer. As a result, it is possible to reduce the manufacturing cost of the synthesis gas.

In particular, before the natural gas containing hydrogen sulfide and carbon dioxide is fed to the hydrogen sulfide-removing device 30, the natural gas is allowed to pass through the natural gas-introducing passageway $20_2$ which is designed to pass through the convection portion 13 of the reformer 10, thereby heating up the natural gas to a temperature which is optimal for the reaction between the hydrogen sulfide in the natural gas and the triiron tetraoxide filled in the first desulfurizing columns $31_1$ to $31_3$ of the hydrogen sulfide-removing device 30, thus making it possible to reduce the quantity of fuel to be used for the removal of the hydrogen sulfide.

Further, as seen from the hydrogen sulfide-removing device 30 shown in FIG. 2, since the natural gas containing hydrogen sulfide and carbon dioxide is permitted to pass through the first desulfurizing column $31_1$ which is filled with the triiron tetraoxide ($Fe_3O_4$) particles (the first desulfurizing column $31_1$ which is disposed on the left side in FIG. 2) and then through the second desulfurizing column 36 which is filled with the zinc oxide (ZnO) particles, it is now possible to selectively remove only the hydrogen sulfide to a level in the order of ppm from the natural gas.

As a matter of fact, when a natural gas having a composition of: $CH_4$; 86.5 vol. %, $C_2H_6$; 1.8 vol. %, $N_2$; 4.0 vol.

%, $CO_2$; 7.1 vol. % and $C_2S$; 0.6 vol. % was treated by means of the hydrogen sulfide-removing device 30 shown in FIG. 2 by allowing it to pass through the first desulfurizing column $31_1$ which is filled with the triiron tetraoxide ($Fe_3O_4$) particles (the first desulfurizing column $31_1$ which is disposed on the left side in FIG. 2) and then through the second desulfurizing column 36 which is filled with the zinc oxide (ZnO) particles, it was possible to obtain a natural gas having a composition of: $CH_4$; 87.0 vol. %, $C_2H_6$; 1.8 vol. %, $N_2$; 4.1 vol. %, $CO_2$; 7.1 vol. % and $C_2S$; 1 ppm or less. Namely, it was possible to leave the carbon dioxide remain almost entirely in the raw natural gas and at the same time, to selectively remove most of the hydrogen sulfide.

Furthermore, as seen from the hydrogen sulfide-removing device 30 shown in FIG. 2, since three units of first desulfurizing columns $31_1$ to $31_3$ each filled with the triiron tetraoxide ($Fe_3O_4$) particles are juxtaposed, enabling a first placed first desulfurizing column to execute an adsorption operation of hydrogen sulfide, enabling a second placed first desulfurizing column to execute an operation of regenerating the adsorbent adsorbed with hydrogen sulfide, also enabling a third placed first desulfurizing column to execute an operation of reducing the adsorbent that has been regenerated, and further enabling these operations to be sequentially executed, it becomes possible to more smoothly and effectively remove the hydrogen sulfide from the natural gas.

To the natural gas thus depleted of hydrogen sulfide by way of the aforementioned procedures, steam and carbon dioxide are added to obtain a mixed gas, which is then fed to the reaction tube 11 of the reformer 10 to execute the steam reforming of the mixed gas, thereby manufacturing a synthesis gas with a molar ratio of $H_2/CO$ ranging from 1 to 2.5. This synthesis gas having such a molar ratio of $H_2/CO$ is then fed to the Fisher-Tropsch (FT) reaction system 53 which is filled with a cobalt-based catalyst for instance, thereby allowing the hydrogen and carbon monoxide all included in the synthesis gas to react with each other, thus synthesizing gasoline, kerosene and gas oil at a high yield.

By the way, in the foregoing embodiment, the carbon dioxide to be added to the natural gas is procured by recovering carbon dioxide from the combustion exhaust gas generated at the combustion radiation portion or from the synthesis gas. However, the carbon dioxide can be procured from different sources. For example, it is possible to employ carbon dioxide that can be recovered from the combustion exhaust gas generated at the boiler, or carbon dioxide which has been discarded in other plants. Namely, the carbon dioxide that has been discarded in other plants can be effectively utilized as a raw material in the method of manufacturing methanol according to this invention, so that it is now possible to reduce the quantity of carbon dioxide to be released into air atmosphere, thereby contributing to the prevention of the warm-up of the globe.

In the foregoing embodiment, the synthesis gas manufactured in the reformer is introduced into the Fisher-Tropsch reaction system so as to synthesize gasoline, etc. However, the synthesis gas manufactured in the reformer can be also applied to the synthesis of methanol or dimethyl ether.

As explained above, it is possible according to this invention to effectively utilize the carbon dioxide in a natural gas containing hydrogen sulfide and carbon dioxide by selectively removing only the hydrogen sulfide therefrom in a method for manufacturing a synthesis gas from the natural gas containing hydrogen sulfide and carbon dioxide by making use of a reformer, thereby making it possible to reduce the quantity of carbon dioxide to be added to the natural gas prior to the stage where the natural gas is to be transferred to the reformer. Further, it is also possible according to this invention to provide a method of manufacturing a synthesis gas which is suited for the synthesis of gasoline, kerosene and gas oil by way of the Fisher-Tropsch reaction system, or for the synthesis of methanol or dimethyl ether at low cost.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a synthesis gas containing hydrogen and carbon monoxide, which comprises steps of;
   providing a hydrogen sulfide-removing device comprising:
   (a) at least three units of first desulfurizing columns to be filled with triiron tetraoxide, wherein a first placed desulfurizing column among the first desulfurizing columns is designed to execute an adsorption operation of hydrogen sulfide, a second placed desulfurizing column among the first desulfurizing columns is designed to execute an operation of regenerating the adsorbent (iron sulfide) on which hydrogen sulfide is adsorbed and a third placed desulfurizing colum among the first desulfurizing columns is designed to execute an operation of reducing the adsorbent that has been regenerated, these operations being sequentially executed, and
   (b) a second desulfurizing column filled with the hydrogen sulfide adsorbent comprising zinc oxide:
   removing only hydrogen sulfide from a natural gas containing hydrogen sulfide and carbon dioxide by permitting the natural gas to pass through one column selected from these first desulfurizing columns and the second desulfurizing column of the hydrogen sulfide-removing device;
   adding carbon dioxide and steam to the natural gas from which the hydrogen sulfide has been removed to prepare a mixed gas; and
   feeding the mixed gas into a reaction tube of a reformer, thereby permitting mainly a steam reforming reaction to take place in the mixed gas,
   wherein the molar ratio between methane ($CH_4$) in the natural gas and carbon dioxide ($CO_2$) falls within the range of $CH_4:CO_2=1:1$ to $1:3$ on the occasion of adding steam and carbon dioxide to the natural gas.

2. The method of manufacturing a synthesis gas according to claim 1, wherein before the natural gas is fed to the hydrogen sulfide-removing device, the natural gas is forced to pass through a convection portion communicated with a combustion radiation portion of the reformer, thereby heating said natural gas up to a temperature which is suited for the reaction between the hydrogen sulfide in the natural gas and the hydrogen sulfide adsorbent.

3. The method of manufacturing a synthesis gas according to claim 1, wherein the carbon dioxide recovered from a combustion exhaust gas generated at a combustion radiation portion of the reformer is utilized as a carbon dioxide source.

4. The method of manufacturing a synthesis gas according to claim 1, wherein the carbon dioxide recovered from the synthesis gas at a downstream side of the reformer is utilized as a carbon dioxide source.

* * * * *